Aug. 15, 1939.   H. B. HOLMES ET AL   2,169,249
METHOD OF AND MEANS FOR EFFECTING DOWNSTREAM MIGRATION OF FISH ABOUT DAMS
Filed March 1, 1938

Inventors
Harlan B. Holmes
Henry F. Blood
Milo C. Bell
By Adam Richmond
Attorney Patented Aug. 15, 1939

2,169,249

UNITED STATES PATENT OFFICE 2,169,249

METHOD OF AND MEANS FOR EFFECTING DOWNSTREAM MIGRATION OF FISH ABOUT DAMS

Harlan B. Holmes and Henry F. Blood, Portland, Oreg., and Milo C. Bell, Seattle, Wash., assignors to the Government of the United States of America, as represented by the Secretary of War Application March 1, 1938, Serial No. 193,294

4 Claims. (Cl. 61—21)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to improved methods and means for promoting the safe and economical downstream migration of fish about dams. It consists primarily of means for utilizing, to the best advantage, considerable quantities of flowing water to attract the fish and induce them to enter by-passes about the dams, and of means for diverting the major portions of such flows into channels other than the by-passes for fish. Such diversion serves to permit the use of by-passes for fish much smaller than would be necessary were they required to carry the full flow of attraction water to the tailrace. Furthermore, where economy in the use of water is a factor, such diverted water may be put to useful work with but little loss of head.

In the provision of aids to the passage of migrating fish about dams, much attention has been given to the development of suitable fishways for the use of mature fish in their upstream migration. Very little consideration has been given, however, to the development of suitable facilities for the use of downstream migrants, such fish being required in general to pass through either spillways or hydraulic turbines. While in some instances these routes may not be objectionable, there are cases where the mortality is very high in fish subjected to such treatment.

Those fishways provided for upstream migrants usually are accessible as downstream passes, but due to their limited water carrying capacity and because they usually are not favorably located with respect to turbine intakes and to spillways, they offer little attraction to downstream migrants. Even in those cases where especially located by-passes have been provided, the comparatively limited water carrying capacity of such devices enables them to compete but poorly with the counter attractions offered by turbine and spillway flows.

It frequently is economically impractical to screen the turbine intakes and spillways with the very fine mesh screens required to exclude fingerling migrants. All that can be done in such cases is to make these hazardous routes as unattractive as possible and/or to accentuate the attractiveness of the fishways or special by-passes. Even where the hazardous routes are screened, there frequently is need of means for making the entrances to the by-passes more attractive to the fish.

In view of the foregoing, the primary object of our invention is to provide means for improving the effectiveness of by-passes for downstream migrants by utilizing for the attraction of such fish a quantity of water in excess of that which economically can be permitted to flow down such fishways to the tailrace.

Another object is to provide means whereby a large quantity of the water utilized to attract downstream migrants to a by-pass need not be wasted to the tailrace but may be used to advantage for other purposes.

Another object is to provide means whereby the water utilized to attract downstream migrants to a by-pass may be controlled and regulated so as to maintain most effective conditions of velocity and direction of flow.

Other objects, and objects relating to details of construction, combination and arrangement of parts will appear hereinafter in the description to follow.

In general the invention comprises an intake structure, in open communication with the forebay of a dam, to be used in conjunction with the entrance to a by-pass for downstream migrants. The principal feature of the structure is a water passage, or entry bay, which has a broad entrance in open communication with the forebay and which converges to a much smaller cross sectional area at its opposite end where it joins the by-pass. This entry bay is bounded in part by a series of screens through which the bulk of the water taken into it from the forebay is diverted, after having passed the portal and fulfilled its function of attracting fish therethrough, either to be utilized for other purposes or to be wasted to the tailrace. The remaining small portion of the flow continues through the passage to the bypass and thence to the tailrace, providing a medium by which the downstream migrants may be conveyed safely past the dam. The relations between the area of screens with respect to the cross sectional area of the water passage, and between the position of screens with respect to the convergence of the water passage, also the position of the by-pass with respect to the water passage and the screens, are such that the prevailing direction of flow in the water passage is from the forebay toward the by-pass rather than toward the screens through which the bulk of the water is diverted. As a result of this condition of flow, the fish attracted into the passage by the large flow of water are not inclined to attempt vainly to pass through the screens but are led by the prevailing direction of flow to the bypass through which they are conveyed safely to the tailrace.

Referring more particularly to the accompanying drawing in which corresponding parts are indicated by similar reference characters throughout the several views.

Figure 1:
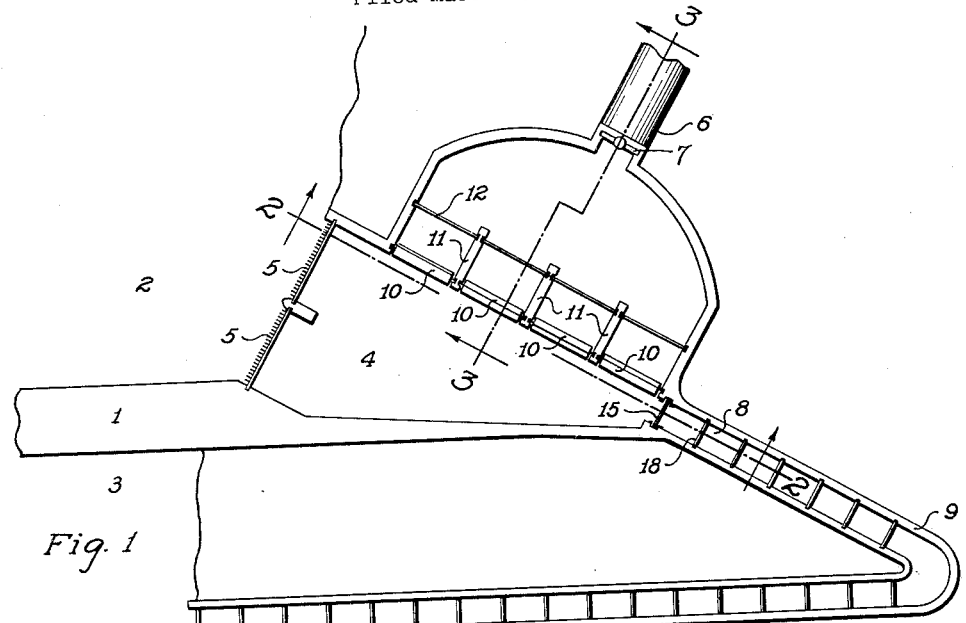
Figure 1 is a plan view of a preferred embodiment of the invention, shown incorporated in a dam.
Figure 2:
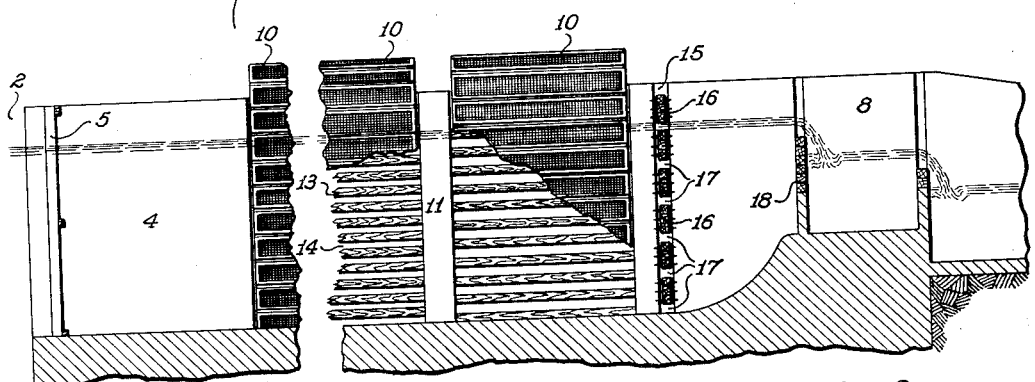
Fig. 2 is a sectional fragmentary elevation of the invention, taken substantially along the line 2—2 of Fig. 1 and in the direction indicated.
Figure 3:
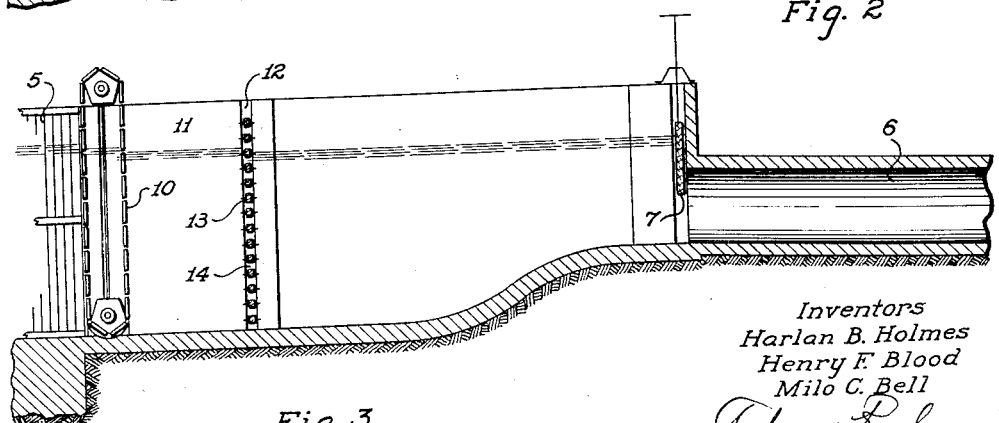
Fig. 3 is a sectional fragmentary elevation of the invention taken substantially along the line 3—3 of Fig. 1 and in the direction indicated.

In the figures are shown, a dam structure 1, impounding water in a forebay 2 and having a tailrace 3. An entry bay 4 is in open communication at its portal with the forebay 2 from which it receives a flow of water that may be passed through trash racks 5. The major portion of the flow passing through the entry bay 4 is diverted through fish screens 10 to conduit 6, provided with suitable control means such as a valve 7. The remainder of the flow is discharged into the upstream end of any suitable by-pass for fish, as into upstream pool 8 of conventional fish ladder 9, which consists of a succession of stepped pools descending from the level of the forebay 2 to that of the tailrace 3.

The conduit 6 may terminate at its remote end, not here shown, in any of several ways as required, such as into a power wheel, or an irrigation supply canal, or other useful provision. If water economy is not a matter of importance the conduit may carry the water directly to the tailrace.

To promote a substantially equal and uniform distribution of flow over the area of the screens 10, adjustable diffusion grills 12 are provided. These grills may be removable structures comprising each a frame in which cross members 13 are adjustably disposed to form a series of apertures 14, distributed as desired over the area of the grill. By varying the width or spacing of the cross members 13, the ratio of opened to closed area in the individual grills may be regulated to produce the baffling effect required to regulate the flow of water through the individual screens. For structural reasons it is preferred that the grills 12 be utilized only to regulate the relative rate of flow through the several screens 10 or through parts of the same screen. The valve 7 is provided to control the total quantity of water passing through the combined screens to the conduit 6.

Of the water flowing into the entry bay 4, that which does not pass through the screens 10 and into conduit 6 is discharged into a suitable by-pass, as into the upstream pool 8 of the fish ladder 9. Control of the quantity of water flowing into the by-pass may be effected by suitable means, as by adjustment of the elevation of the crest of the weir 18, which forms the upstream wall of pool 8.

A grill 15, provided with adjustable baffle members 16, may be disposed slightly upstream from the weir 18. The baffle members 16 may be adjusted to form apertures 17 so distributed over the area of the baffle as to insure that the water flowing over the crest of the weir 18 is drawn from various depths of the entry bay 4, as desired. By adjusting the combined area of the apertures 17 with relation to the quantity of water discharged into the by-pass, the velocity at which the water passes through the apertures 17 may be controlled as desired.

In operation, a comparatively large volume of water is drawn from the forebay 2 into the entry bay 4. The greater part of such water passes through the fish screens 10 into the conduit 6 and thence as desired. The remainder, much less in volume, passes into the by-pass represented by the fish ladder 9. Fish attracted into the entry bay 4 by the large volume of water, and diverted by the screens 10 from the portion of the flow taken by the conduit 6, follow the prevailing direction of flow to the by-pass through which they pass safely to the tailrace.

An important feature of the invention is the control of the hydraulic conditions by which the large volume of water is utilized to best advantage to attract the fish into the by-pass. It is preferred that the prevailing direction of flow throughout the entry bay be from the forebay toward the by-pass rather than toward the screens through which the greater part of the flow is diverted. In order to accomplish this condition, the area of screens is made greater than that of the upstream end of the entry bay and the entry bay is converged approximately in proportion to the distribution of screens along the passage. These conditions cause the rate of flow through the screens to be lower than that along the entry bay toward the by-pass.

The velocity of flow through the screens must be low enough to enable the fish to avoid being carried thereagainst. Ideally, the rate of flow through the screens would be below that at which it would be apparent to the fish, in which case all of the fish would continue with the prevailing flow without being subjected to any counter attraction. Such a condition would require, however, a large installation of screens the expense of which would not, ordinarily, be warranted.

The screens preferably are placed flush with the wall of the entry bay rather than in recesses, thus permitting the water to sweep obliquely across the screens and eliminating pockets in which fish might congregate and escape being influenced by the directional flow in the entry bay. As the shape of the entry bay may not be most favorable for producing an even flow through the several screens, the grills 12 are provided as a means of regulating the flow. By adjustment of the valve 7 and the weir 18 the flow throughout the system may be regulated to a velocity that is shown by experience to be most effective. The rate of flow through the screens must be low enough to permit fish that approach the screens to change their course before they are swept against the screens.

Having thus described the invention, what we claim and wish to secure by Letters Patent is:

1. The method of by-passing downstream migrants about a dam structure which consists in directing a flow of water at constant velocity into a fishway and then diverting a portion of the flow as a water conservation measure, said diversion of the water being effected without materially disturbing the velocity and prevailing direction of flow into the fishway and under conditions excluding the escape of the migrants at the point of water diversion.

2. In a fingerling by-pass for dams and the like, a dam construction including a forebay, a tailrace, a fishway disposed between the forebay and the tailrace and means for directing a flow of water from the forebay into the fishway at constant velocity, said means including an entry bay and screened means in open communication with the entry bay for withdrawing a portion of the flow from the entry bay without affecting its prevailing direction and velocity.

3. In a fingerling by-pass for dams and the like, a dam structure including a forebay, a tailrace, an entry bay in open communication at one end with the forebay, a fishway extending between the entry bay and the tailrace, and means in connection with the entry bay and the fishway for directing a flow of water at substantially constant velocity from the entry bay into the fishway, said means including a flume in screened communication with the entry bay and valve means associated with said flume whereby a portion of the flow through the entry bay may be diverted as a water conservation measure without affecting the velocity and prevailing direction of flow from the entry bay into the fishway.

4. In a fingerling by-pass for dams and the like, a dam structure including a forebay, a tailrace and entry bay disposed on the upstream side of the dam structure and in open communication with the forebay, a fishway extending between the entry bay and the tailrace, means in connection with the entry bay and the fishway for directing a flow of water through the entry bay and into the fishway at substantially constant velocity, said means including a flume screened at one end and having its screened end in communication with the entry bay, and valve controlled means associated with the flume for withdrawing a portion of the water from the entry bay as a water conservation measure without affecting the velocity and prevailing direction of flow through the entry bay into the fishway.

HARLAN B. HOLMES.
HENRY F. BLOOD.
MILO C. BELL.